Feb. 4, 1958  J. PAVELKA  2,821,775
APPARATUS FOR INSERTING CONNECTING NIPPLES INTO HOSE
Filed March 29, 1955
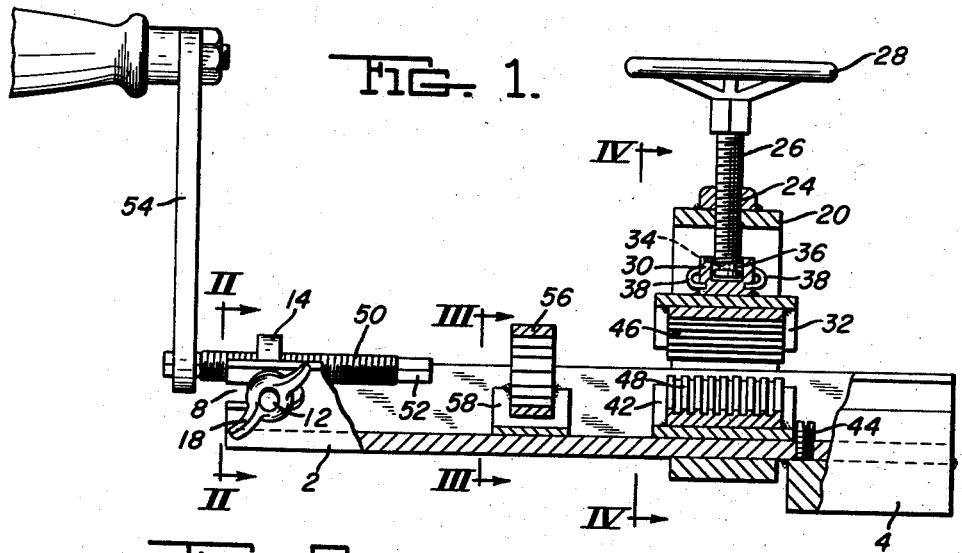
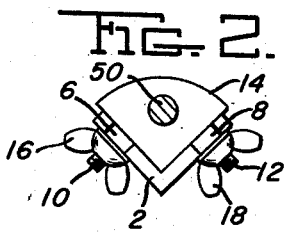
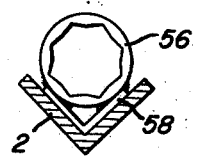
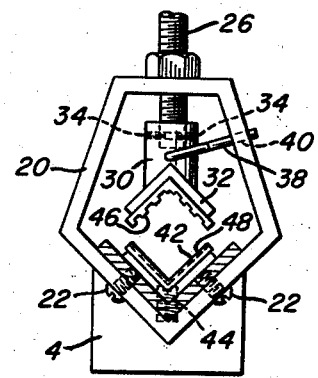
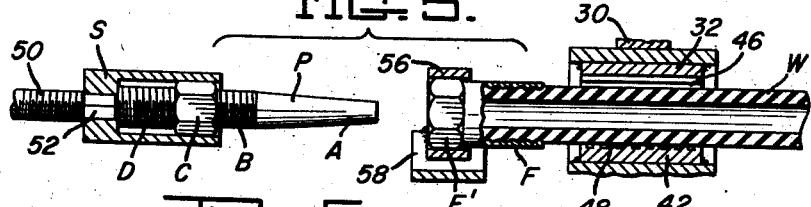
INVENTOR:
JERRY PAVELKA,
BY: Donald G. Dalton
his Attorney.

United States Patent Office 2,821,775
Patented Feb. 4, 1958

2,821,775

APPARATUS FOR INSERTING CONNECTING NIPPLES INTO HOSE

Jerry Pavelka, Gary, Ind., assignor to United States Steel Corporation, a corporation of New Jersey Application March 29, 1955, Serial No. 497,718

3 Claims. (Cl. 29—237)

The present invention relates generally to couplings for flexible hose and more particularly to apparatus for inserting connecting nipples into hose.

A common type of hose union or coupling widely utilized throughout industry consists of an internally threaded ferrule which is fitted on the exterior of one end of the hose and connecting nipple which is inserted into the hose with a portion thereof projecting outwardly of the hose ferrule. The nipple is provided with an externally threaded portion intermediate its ends which is connected with internal threads on the hose ferrule when the nipple is in position in the hose. The inserted end of the nipple is tapered so as to facilitate insertion into the hose. The projecting end of the nipple is externally threaded for connection with a supply line or unit of equipment. The inserted portion of the nipple is tapered to the end thereof to a diameter only slightly smaller than the inside diameter of the hose in order to make the coupling tight and leakproof.

Heretofore the tapered end of the nipple was forced by hand into the end of the hose until the threads of the ferrule and the nipple engaged. After the threaded connection had been started, the nipple was screwed into the ferrule until it was properly fitted. The operation of forcing the tapered nipple end into the hose was particularly difficult because the bore of the hose would enlarge only a slight amount until the hose wall was tightly packed between the tapered end of the nipple and the inner surface of the ferrule. Further entry of the tapered nipple was resisted considerably by the tightly packed hose wall.

It is, accordingly, an object of my invention to provide a device for inserting a nipple into a hose which includes a hose vise and nipple feed shaft arranged in a unit for accomplishing the insertion operation more easily and more quickly than has been possible heretofore.

This and other objects will become more apparent after referring to the following specification and attached drawings in which:

Figure 1 is a side elevational view partly in section;

Figure 2 is a view taken on the line II—II of Figure 1;

Figure 3 is a view taken on the line III—III of Figure 1;

Figure 4 is a view taken on the line IV—IV of Figure 1;

Figure 5 is a longitudinal sectional view, with parts broken away for clarity, showing a connecting nipple in position to be inserted into a hose retained in the device of the invention; and Figure 6 is a view of a completed hose and connecting nipple assembly.

Referring more particularly to the drawings reference numeral 2 designates the base or bed of the device which may be in the form of a trough made of a length of angle bar, one end of which is positioned in a V-notched bed block 4 and welded thereto. The opposite end of the bed 2 is slotted as at 6 and 8, to receive studs 10 and 12 which project from a screw shaft bearing block 14 which is mounted on the bed 2 and detachably secured thereto by means of the studs 10 and 12 and wing nuts 16 and 18. A hose vise frame 20, made in the shape of a hollow pentagon, is fitted on the bed adjacent block 4 by means of screws 22. The upper horizontal side of the frame 20 is provided with a threaded aperture 24 through which is threaded a screw shaft 26 having a hand wheel 28 affixed to the upper end thereof. The lower end of the screw shaft 26 is fitted into the shank 30 of a movable vise jaw 32 by means of a pair of diametrically opposed set screws 34. The inner ends of the set screw 34 are received in a circumferential groove 36 in the end of the screw shaft 26 in such a manner that the screw shaft may rotate within the shank 30. In order to prevent the movable jaw 32 from turning with the screw shaft 26, a Y-shaped clip 38 engages two diametrically opposed holes in the jaw shank 30 and extends therefrom with its stem end being inserted into a hole 40 in a side of the vise frame 20. A fixed jaw 42 is mounted on the bed 2 within the frame 20 for cooperation with the movable jaw 32 to clamp a hose therebetween. The fixed jaw 42 is fixed against axial movement by means of a set screw 44 which is threaded into the bottom of bed 2. The movable jaw 32 is V-shaped and is provided with a series of longitudinal teeth 46 on its gripping face so that it may firmly grip the hose and prevent it from turning in the clamp. The fixed jaw 42 is also V-shaped but is provided with a series of transversely extending teeth 48 with which to grip the hose and thereby prevent axial movement thereof.

A feed screw shaft 50 having a wrench-engaging end 52 is threaded through and supported by the bearing 14 with its wrench-engaging end 52 extending toward the frame 20. The outward end of the shaft 50 has connected therewith a handle 54 for rotating the shaft to advance it toward or withdraw it from the frame 20.

A wrench ring 56, which is welded to a section of angle bar 58, is loosely positioned on the bed 2 between and in alignment with bearing 14 and frame 20.

In operation, a hose W having a female coupling ferrule F fitted on its end is clamped between the jaws 32 and 42 with the ferrule F projecting toward the shaft 50. The ferrule F is provided with an internally threaded nut section $F^1$. The wrench ring 56 is moved along the bed 2 and is fitted on the nut section $F^1$ of the ferrule F to prevent rotation thereof. A socket wrench S is mounted by one end on the end 52 of the feed shaft 50. A nipple P having a tapered end A, an externally threaded increased diameter portion B adjacent said tapered end, a nut section C, and an end threaded section D is fitted into the socket wrench S with the tapered end and threaded section projecting therefrom. After the nipple has been inserted into the socket wrench the feed shaft 50 is rotated by means of the handle 54 to advance the tapered end A of the nipple into the hose W. After the tapered end of the nipple has advanced past the internally threaded section of the ferrule F, the threads on the threaded intermediate portion B engage the internal threads of the ferrule $F^1$. The operation is completed by continuing to turn handle 54 until the end of the nut section C of the nipple abuts the end of the ferrule $F^1$. Then the wing nuts 16 and 18 are loosened so that the bearing 14 and feed shaft 50 with the socket wrench S on its end may be withdrawn from engagement with the nipple P.

If the lead of the feed shaft 50 is not the same as the lead of the threads on portion B of the nipple, wing nuts 16 and 18 are loosened and the feed shaft assembly, including bearing 14 and crank 54, socket wrench S and feed shaft 50, is removed and the nipple is screwed into the ferrule F by means of a hand wrench.

To fit the other end of the hose with a nipple, the hose is removed from the vise, turned endwise, reclamped and the operation is repeated.

While one embodiment of my invention has been shown and described, it will be apparent that other adaptations and modifications may be made without departing from the scope of the following claims.

I claim:

1. Apparatus for inserting a connecting nipple into hose having a ferrule fitted on one end which comprises an elongated V-shape bed, a vise mounted on said bed adjacent one end thereof, said bed having a longitudinal slot in each leg thereof at its end remote from said vise, a bearing having a pair of spaced studs projecting angularly therefrom mounted on said remote end of said bed with said studs fitting into said slots and projecting from said bed, means on said studs for detachably retaining said bearing on said bed in alignment with said vise, a feed shaft having a wrench-engaging end threaded through and supported by said bearing with its wrench-engaging end extending toward said vise, means attached to said feed shaft for rotating the same, and a wrench ring mounted on said bed between and aligned with said vise and said bearing, said wrench ring being fixed against rotational movement and adapted to rigidly engage said ferrule.

2. Apparatus for inserting a connecting nipple into hose having a ferrule fitted on one end which comprises an elongated V-shape bed, a frame mounted on said bed and projecting normal thereto adjacent one end thereof, a fixed vise jaw mounted on said bed within said frame, a screw shaft threaded through the side of said frame opposite said fixed jaw, a movable vise jaw rotatably mounted on the end of said screw shaft toward said fixed jaw, means on the opposite end of said screw shaft for rotating the same, said movable jaw being adapted to move toward said fixed jaw to clamp said hose therebetween and to move away from said fixed jaw to release said hose upon rotation of said screw shaft, said bed having a longitudinal slot in each leg thereof at its end remote from said frame, a bearing having a pair of spaced studs projecting angularly therefrom mounted on said remote end of said bed with said studs fitting into said slots and projecting from said bed, means on said studs for detachably retaining said bearing on said bed in alignment with said frame, a feed shaft having a wrench-engaging end threaded through and supported by said bearing with its wrench-engaging end extending toward said frame, means attached to said feed shaft for rotating the same, and a wrench ring mounted on said bed between and aligned with said vise and said bearing, said wrench ring being fixed against rotational movement and adapted to rigidly engage said ferrule.

3. Apparatus for inserting a connecting nipple as defined by claim 2 characterized by each of said jaws having serrated V-shape hose engaging faces.

References Cited in the file of this patent

UNITED STATES PATENTS

| | | |
|---|---|---|
| 243,589 | Mallinckrodt | June 28, 1881 |
| 348,182 | Amidon | Aug. 31, 1886 |
| 443,312 | Bode | Dec. 23, 1890 |
| 611,540 | Whitaker | Sept. 27, 1898 |
| 1,068,754 | Ferry | July 29, 1913 |
| 2,367,672 | Cosmo et al. | Jan. 23, 1945 |

FOREIGN PATENTS

| | | |
|---|---|---|
| 956,310 | France | Jan. 30, 1950 |

UNITED STATES PATENT OFFICE

CERTIFICATE OF CORRECTION

Patent No. 2,821,775                                                      February 4, 1958

Jerry Pavelka

It is hereby certified that error appears in the above numbered patent requiring correction and that the said Letters Patent should read as corrected below.

In the grant, lines 1 and 2, for "Jerry Pavelka, of Gary, Indiana, assignor to United States Steel Corporation, a corporation of New Jersey," read -- Jerry Pavelka, of Gary, Indiana, --; line 11, for "United States Steel Corporation, its successors" read -- Jerry Pavelka, his heirs --; in the heading to the printed specification, lines 4 and 5, for "Jerry Pavelka, Gary, Ind., assignor to United States Steel Corporation, a corporation of New Jersey" read -- Jerry Pavelka, Gary, Ind.

Signed and sealed this 1st day of April 1958.

(SEAL)
Attest:

KARL H. AXLINE
Attesting Officer

ROBERT C. WATSON
Commissioner of Patents